United States Patent
Ishibashi et al.

(10) Patent No.: US 9,598,964 B2
(45) Date of Patent: Mar. 21, 2017

(54) STEAM TURBINE STATIONARY BLADE AND STEAM TURBINE

(71) Applicant: Mitsubishi Hitachi Power Systems, Ltd., Yokohama, Kanagawa (JP)

(72) Inventors: Koji Ishibashi, Tokyo (JP); Susumu Nakano, Tokyo (JP); Shunsuke Mizumi, Tokyo (JP); Takeshi Kudo, Tokyo (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 629 days.

(21) Appl. No.: 14/019,755

(22) Filed: Sep. 6, 2013

(65) Prior Publication Data
US 2014/0079556 A1   Mar. 20, 2014

(30) Foreign Application Priority Data
Sep. 14, 2012   (JP) .................................. 2012-202139

(51) Int. Cl.
*F01D 5/18*   (2006.01)
*F01D 5/14*   (2006.01)
(Continued)

(52) U.S. Cl.
CPC .............. *F01D 5/18* (2013.01); *F01D 5/145* (2013.01); *F01D 9/041* (2013.01); *F01D 25/32* (2013.01); *F05D 2220/31* (2013.01); *F05D 2240/124* (2013.01); *F05D 2240/125* (2013.01); *F05D 2240/127* (2013.01); *Y02T 50/673* (2013.01); *Y02T 50/676* (2013.01)

(58) Field of Classification Search
CPC . F01D 5/18; F01D 5/146; F01D 5/186; F01D 5/187; F01D 9/02; F01D 9/041; F01D 25/32
See application file for complete search history.

(56) References Cited

U.S. PATENT DOCUMENTS

| | | | | |
|---|---|---|---|---|
| 6,305,902 | B1 * | 10/2001 | Konishi | ................. F01D 25/32 415/115 |
| 2002/0114700 | A1 | 8/2002 | Markytan | |
| 2010/0329853 | A1 | 12/2010 | Guo et al. | |

FOREIGN PATENT DOCUMENTS

| | | |
|---|---|---|
| CN | 1217088 C | 8/2005 |
| CN | 101769175 A | 7/2010 |

(Continued)

OTHER PUBLICATIONS

Extended European Search Report in EP 13183013.5-1610, dated Nov. 15, 2013 (6 pages).
(Continued)

*Primary Examiner* — Eric Keasel
*Assistant Examiner* — Cameron Corday
(74) *Attorney, Agent, or Firm* — Crowell & Moring LLP

(57) ABSTRACT

A plurality of slots with different widths are provided in a plurality of line on a stationary blade surface. More specifically, the steam turbine stationary blade has a hollow nozzle with a penetrating space, which is connected with a diaphragm outer ring or inner ring, and a plurality of suction slots extending radially which are arranged on the blade surface. At a position where a water film deposited to the blade surface is thick, the width of a slot is smaller and at a position where the water film is thin, the width of a slot is larger.

8 Claims, 4 Drawing Sheets

(51) Int. Cl.
*F01D 9/04* (2006.01)
*F01D 25/32* (2006.01)

(56) References Cited

FOREIGN PATENT DOCUMENTS

| | | |
|---|---|---|
| DE | 10 2010 023 703 A1 | 12/2011 |
| GB | 1072483 | 6/1967 |
| JP | 51-20322 | 5/1976 |
| JP | 60-73801 U | 5/1985 |
| JP | 1-110812 A | 4/1989 |
| JP | 4-194302 A | 7/1992 |
| JP | 5-106405 A | 4/1993 |
| JP | 6-248903 A | 9/1994 |
| JP | 11-336503 A | 12/1999 |
| JP | 2011-12674 A | 1/2011 |
| WO | WO 2011-157398 | 12/2011 |

OTHER PUBLICATIONS

Korean Office Action issued in counterpart Korean Application No. 10-2013-0099544 dated Jul. 28, 2014 (Four (4) pages).
Chinese Office Action issued in counterpart Chinese Application No. 201310368613.6 dated Dec. 3, 2014 (Seven (7) pages).
Japanese Office Action issued in counterpart Japanese Application No. 2012-202139 dated Dec. 1, 2015, with unverified English translation (seven (7) pages).

\* cited by examiner

STEAM TURBINE STATIONARY BLADE AND STEAM TURBINE

CLAIM OF PRIORITY

The present application claims priority from Japanese Patent application serial no. 2012-202139, filed on Sep. 14, 2012, the content of which is hereby incorporated by reference into this application.

TECHNICAL FIELD

The present invention relates to steam turbine stationary blades and steam turbines and more particularly to a steam turbine stationary blade with slots for removing a water film generated on a stationary blade surface in order to reduce moving blade erosion attributable to collision of water droplets generated by wet steam.

BACKGROUND ART

In the last stage of a low pressure turbine or the second or third last stage thereof, generally the pressure is very low, so the steam as a working fluid is in the state of wet steam which contains liquefied microscopic water droplets (molecules of the vapor). The molecules of the vapor condensed and attached to a blade surface gather and form a liquid film on the blade surface. Then, the liquid film is torn by the working fluid main flow steam into coarse droplets much larger than the original molecules of the vapor and the droplets are splashed downstream. After that, the coarse droplets flow down while they are somewhat pulverized by the main flow steam but remain relatively large. Due to their inertial force, the coarse droplets cannot turn quickly along a flow path like gaseous steam and they quickly collide against the moving blade downstream, which may cause erosion of the blade surface or interfere with the rotation of the turbine blade, resulting in loss.

In the past, in order to prevent such erosion, the tip of the leading edge of the moving blade has been covered by an erosion shield made of a hard high-strength material such as stellite. However, the recent steam turbines tend to have longer blades in which the tip of a moving blade is very thin and from the viewpoint of workability, it cannot be always covered by an erosion shield. Furthermore, generally protection of the blade surface is not enough to prevent erosion, so it is combined with another countermeasure against erosion.

Generally, removal of liquid droplets is most effective in reducing the influence of erosion. For example, as described in Patent Literature 1 (JP-A No. H5 (1993)-106405) and Patent Literature 2 (JP-A No. H11 (1999)-336503), a stationary blade structure has been proposed in which slots for sucking the water film (drain) on a blade surface are formed on the surface of the stationary blade with a hollow portion (cavity) inside which the pressure is low. Both Patent Literature 1 and Patent Literature 2 adopt a structure that a plurality of slot lines, in each of which a plurality of slots are radially arranged in line at regular intervals, are arranged in the axial direction.

CITATION LIST

Patent Literature

[Patent Literature 1] JP-A No. H5 (1993)-106405
[Patent Literature 2] JP-A No. H11 (1999)-336503

SUMMARY OF INVENTION

Technical Problem

While attention is paid to the interval between slot lines in Patent Literature 1, no special consideration is given to the locations of slots in the turbine axial direction as in Patent Literature 1 and Patent Literature 2. In the structures described in Patent Literature 1 and Patent Literature 2, the width is the same among all the slots.

According to the study by the present inventors, the water film thickness (amount of water film) varies with the position on the blade surface in the turbine axial direction and in order to remove the water film efficiently, it is desirable to make a plurality of slot lines in consideration of water film thickness.

An object of the present invention is to provide a steam turbine stationary blade and steam turbine which can separate a water film on a blade surface efficiently and reduce erosion of a moving blade.

Solution to Problem

The present invention is characterized in that a plurality of slots with different widths are provided on a blade surface and arranged so as to constitute plural lines in the turbine axial direction. More specifically, the width of each slot is smaller in a position where a water film deposited to the blade surface is thick and the slot width is larger in a position where the water film is thin.

Advantageous Effects of Invention

According to the present invention, the water film on the blade surface can be separated more efficiently and erosion of the moving blade can be reduced.

The above and further objects and novel features of the invention will more fully appear from the following description of embodiments of the invention.

DESCRIPTION OF EMBODIMENTS

Next, the preferred embodiments of the present invention will be described referring to drawings.

First, a steam turbine to which the present invention is applied will be described referring to FIG. 1. Although in the description of the embodiments below it is assumed that the present invention is applied to the last stage of the steam turbine (low pressure steam turbine), the present invention is effective not only for the last stage. The present invention may be applied to any steam turbine stage under a wet steam environment so that the same advantageous effects are brought about.

Figure 1:
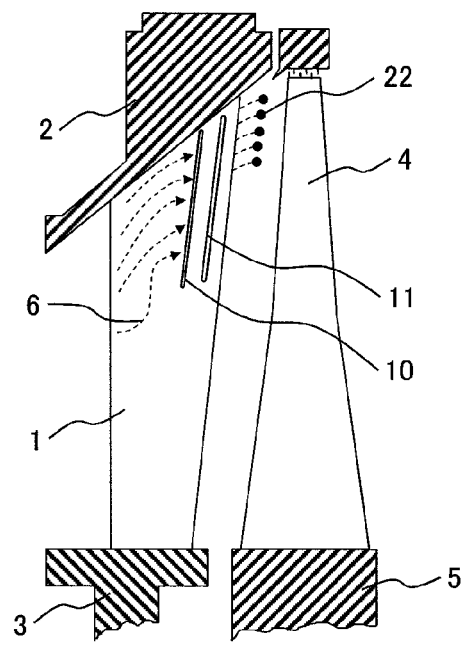
FIG. 1 is a schematic diagram illustrating a steam turbine stage to which the present invention is applied and a water film flowing on a stationary blade surface.

As shown in FIG. 1, the turbine stage of a steam turbine (axial turbine) is located between the high pressure section on the upstream side in the working fluid flow direction and the low pressure section on the downstream side in the working fluid flow direction. The turbine stage (last stage) includes stationary blades 1 and moving blades 4. The stationary blade 1 is fixed between a diaphragm outer ring 2 and diaphragm inner ring 3 which are fixed on the inner peripheral side of a casing. The moving blade 4 is fitted to a disk 5 provided on the periphery of a turbine rotor which rotates around a turbine central axis. Although only the last stage is shown in FIG. 1, a turbine stage comprised of stationary blades and moving blades is repeatedly provided in the working fluid flow direction. The flow of steam which has exited the last stage is passed through an exhaust hood (not shown) and led into a condenser (not shown).

Next, how a water film and liquid droplets are generated on a turbine blade surface in this steam turbine stage structure will be briefly explained referring to FIG. 1. FIG. 1 illustrates only a water film flow 6 toward the moving blade 4 on the blade tip side which may cause erosion. In a low pressure turbine or the like, when the steam main flow as a working fluid is in the state of wet steam, water droplets contained in the steam main flow adhere to the stationary blade 1 and these water droplets gather and form a water film 6. This water film 6 flows in a direction which depends on the resultant force of the pressure and shear force in the interface with the gaseous steam and moves to the vicinity of the trailing edge end of the stationary blade and splashes as water droplets 22 from the blade trailing edge end. The splashed water droplets 22 collide against the moving blade 4 located downstream, possibly causing erosion of the moving blade surface or moisture loss which interferes with the rotation of the moving blade.

Therefore, on the blade surface of the stationary blade 1, slots 10 and 11 extending radially are provided in a plurality of stages (lines) to guide the water film generated by accumulation of water droplets deposited to the blade surface into the inside of the blade. The inside of the stationary blade 1 is a hollow structure and the hollow portion communicates with the hollow portion (not shown) of the diaphragm outer ring 2 and/or the hollow portion (not shown) of the diaphragm inner ring 3. Furthermore, the hollow portion of the diaphragm outer ring communicates with the exhaust hood through a communicating tube (not shown). For this reason, the pressure in the hollow portion inside the stationary blade is lower than the pressure on the stationary blade surface side. In other words, the pressure on the blade surface side of the slots 10 and 11 is higher than the pressure in the hollow portion and due to this pressure difference, the water film on the stationary blade surface is led through the slots 10 and 11 into the hollow portion inside the stationary blade and separated from the steam flow path.

In the conventional structures including those described in Patent Literature 1 and Patent Literature 2, slots (slot lines in which a plurality of slots are radially arranged in line at regular intervals) 10 and 11 are formed to have the same width.

However, according to the study by the present inventors, when slots are formed in a plurality of lines, for efficient removal of the water film it is better for the slots to have different widths.

Figure 4:
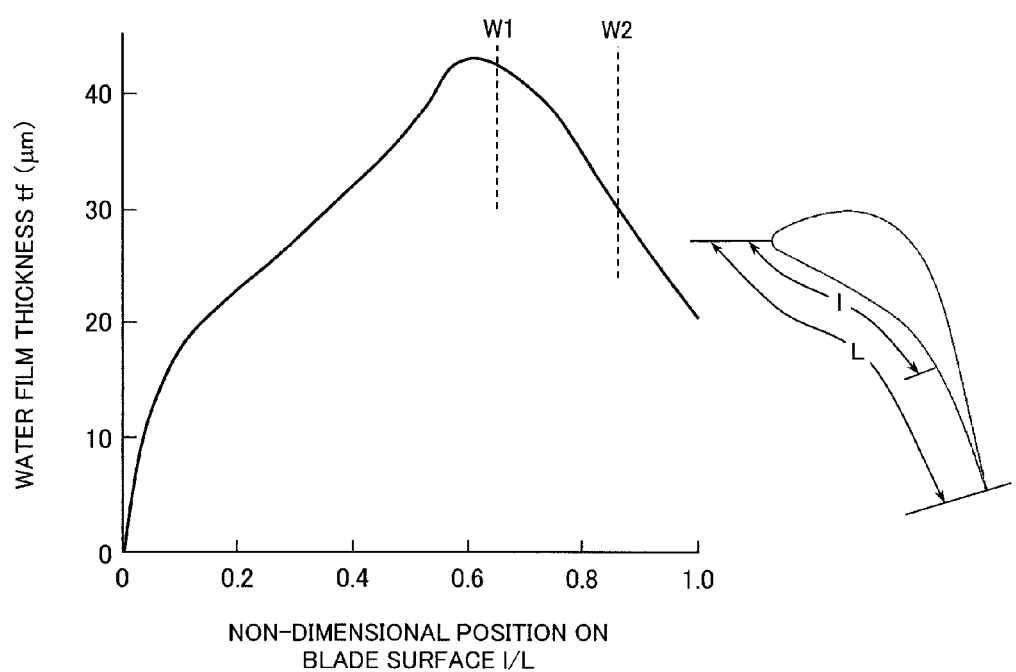
FIG. 4 is a graph showing the relation between the thickness of water film generated on a blade surface and the position on the blade surface.

More specifically, according to the study by the present inventors, first of all, in order to remove the water film efficiently, it is desirable that the slots be formed with consideration to the water film thickness. Also the water film thickness (amount of water film) differs depending on the position on the blade surface in the turbine axial direction. On the downstream side of the stationary blade, the steam flow velocity increases and as indicated in FIG. 4, the moisture accumulated on the blade surface increases and the water film thickness peaks. When the first slot is located downstream of this position, most of the moisture can be separated efficiently. However, downstream of the first slot, the moisture which flows in the steam flow path again is deposited to the blade and forms a water film. For this reason, in the present invention, the second stage slot is used to suck and separate the moisture again. Therefore, in terms of the stationary blade structure, the second stage slot should be as close to the blade trailing edge as possible.

Figure 5:
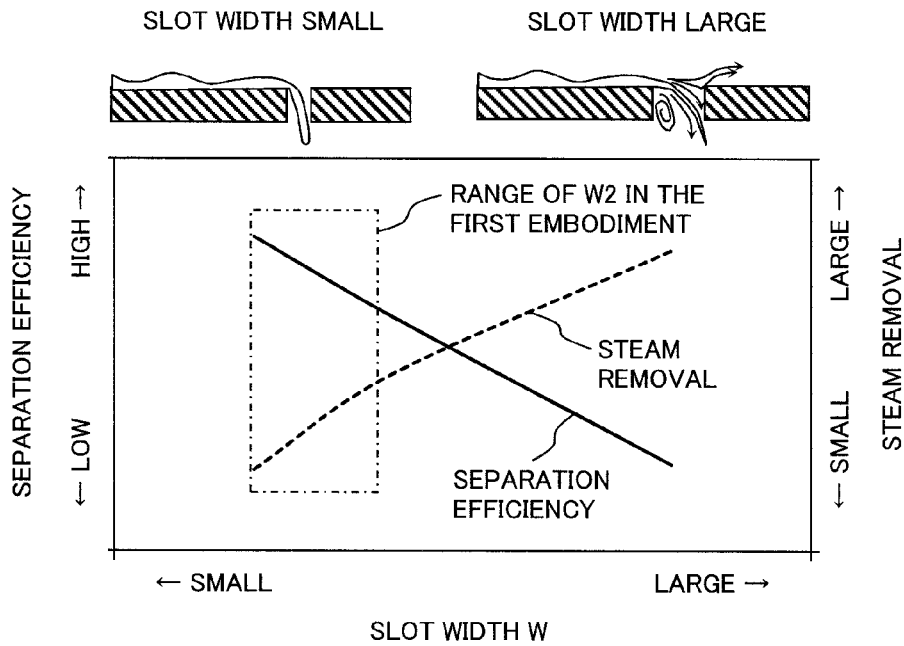
FIG. 5 shows the relation among slot width, water film separation efficiency, and steam removal.

Also, in the conventional structures, the slots are formed with the same dimensions regardless of the amount of water film. According to the study by the present inventors, in that case, they may suck not only the water film flow but also a large amount of steam removal. Also, according to the study by the present inventors, depending on the slot shape (particularly the slot width), the water film may be torn off the slot and splash from the blade surface. In that case, even if the slot is provided for pressure reduction and suction, it would be impossible to remove the moisture which has left the blade surface. For the above reason, in order to separate the water film efficiently, the slot width at a position where the water film is thick is particularly important. Specifically, as illustrated in FIG. 5, in order to increase the water film separation efficiency and reduce the steam removal, a smaller slot width is desirable, so it is better to make the slot width small at a position where the water film is thick. According to the study by the present inventors, the desirable slot width at such a position is approximately 0.5 mm to 1.0 mm as will be explained in detail later.

Therefore, it is desirable that small-width slots be formed near the position where the water film thickness peaks and at a position as close to the blade trailing edge as possible. However, it is structurally difficult to form a small-width slot near the blade trailing edge. Thus, in the present invention, a slot with a small width (for example, about 0.5 mm) which ensures high water film separation efficiency and reduced steam removal is formed at a position where the water film deposited to the blade surface is thick and a slot with a relatively large width (for example, about 1.0 mm) is formed at a position where it is difficult to form a small-width slot and the water film attached to the blade surface is thin, such as near the blade trailing edge.

As explained above, in the present invention, slots which differ in width depending on the position on the blade surface are formed to separate the water film efficiently.

First Embodiment

Next, the first embodiment of the present invention will be described.

Figure 2:
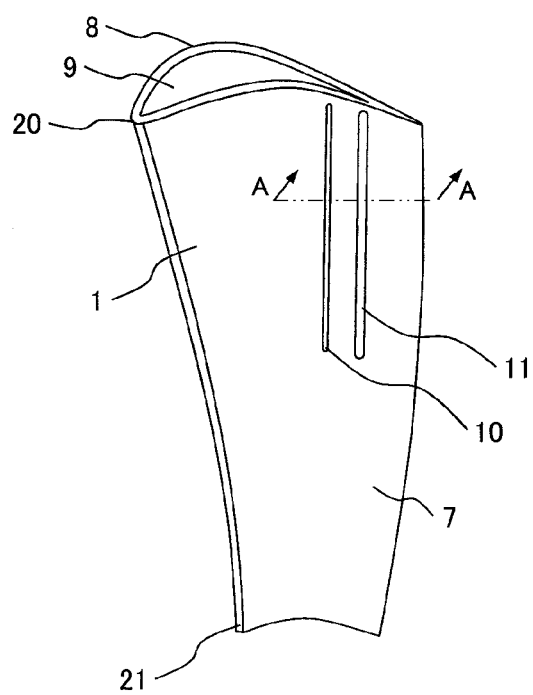
FIG. 2 is a schematic view illustrating a steam turbine stationary blade according to a first embodiment of the invention.
Figure 3:
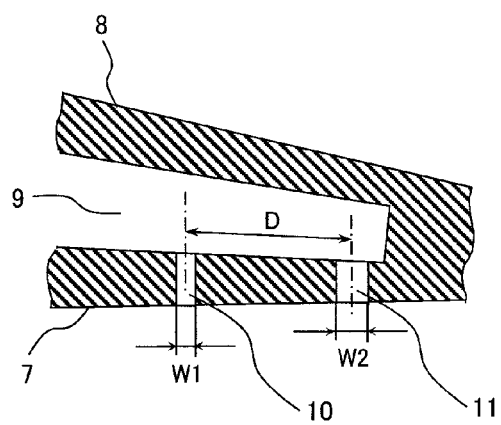
FIG. 3 is a sectional view taken along the chain double-dashed line in FIG. 2.

FIGS. 2 and 3 illustrate the structure of the stationary blade 1 shown in FIG. 1 to which the present invention is applied. FIG. 2 is a schematic perspective view of the stationary blade 1 according to this embodiment and FIG. 3 is a sectional view taken along the chain double-dashed line in FIG. 2.

As shown in FIG. 2, the stationary blade 1 in this embodiment is a hollow nozzle with an inner hollow portion 9 which is formed by plastic deformation by bending a metal plate or a similar technique. The blade tip 20 and blade base 21 are connected with the diaphragm outer ring 2 and diaphragm inner ring 3 shown in FIG. 1 respectively and their downstream sides are connected with a low pressure section such as a condenser. A plurality of slots which communicate with the blade surface and hollow portion 9 are formed in the blade pressure side 7; specifically the first slot 10 and second slot 11 are located with distance D between them. The first slot 10 and second slot 11 need not be parallel to each other; they may be linear or curved along the blade trailing edge shape in the slot length direction. Although FIG. 2 shows a case that the slots are short in the height direction of the stationary blade 1 (radial direction), namely the slots are formed only on the blade tip side 20, instead they may extend from the blade root side 21 to the blade tip side 20 along the whole blade length.

Next, the positions of the first slot 10 and second slot 11 will be explained referring to FIGS. 3 and 4. FIG. 4 shows an example of the relation between the thickness of water film generated on the blade surface pressure side 7 and the position on the blade surface. The horizontal axis represents the non-dimensional distance as distance 1 measured along the blade surface from the blade leading edge end to a given position on the blade surface, divided by distance L measured along the blade surface from the blade leading edge end to the blade trailing edge end. Generally the thickness of water film deposited to the stationary blade surface is the maximum around the non-dimensional position of l/L=0.6 on the blade surface and after that, as the steam main flow velocity increases, the water film thickness decreases and some part of the film becomes unstable and splashes from the blade surface.

Therefore, in this embodiment, as shown in FIG. 3, the first slot 10 is formed with width W1 on the upstream side within the area of l/L=0.6-0.8, which is nearly downstream of the thick portion of the water film deposited to the blade pressure side. On the downstream of the area of l/L=0.6-0.8, the steam flow velocity becomes higher and the water film thickness is smaller, but even if the water film is completely removed by the first slot 10, on the downstream a large amount of water film is again generated and deposited to the blade surface. In order to remove this water film as much as possible, the second slot 11 is formed with width W2 at a position where l/L is larger than that of the first slot 10 and as close to 1.0 as possible (nearest to the blade trailing edge end). Here, the relation between the width of the first slot 10 and the width of the second slot 11 is W1<W2 as will be discussed below. In other words, in the stationary blade main flow direction, the width of the second slot 11 on the downstream is larger than the width of the first slot 10 on the upstream.

The slot width W of the first slot 10 and second slot 11 is explained below referring to FIG. 5. FIG. 5 shows an example of the relation among slot width W, water film separation efficiency, and steam removal. The horizontal axis represents slot width W, the left-hand vertical axis represents water film separation efficiency and the right-hand vertical axis represents the amount of steam removal. In the figure, the solid line indicates the tendency of separation efficiency in relation to the slot width and the broken line indicates the tendency of steam removal in relation to the slot width. This shows the tendency that when the slot width is smaller, the amount of steam removal is smaller and the separation efficiency of the water film flowing on the blade surface is higher. On the other hand, it shows the tendency that when the slot width is larger, the amount of steam removal is larger and the water film separation efficiency is lower. This is because when the slot width is large, a vortex flow region is generated in the slot space and water droplets generated from the water film flow downstream together with the steam flow, which is illustrated in FIG. 5 by the images of slots sucking a water film.

As for the slot width, Patent Literature 2 describes that each slot in a plurality of lines is desirably about 2 mm. As mentioned above, according to the study by the present inventors, it has been confirmed that a smaller slot width is better and a slot width of about 1.0 mm suppresses the possibility that a vortex flow region is generated in the slot space and the possibility that water droplets splash from the water film and flow downstream together with the steam flow. However, when the slot width W is closer to 0, the separation efficiency decreases, and from the viewpoint of workability, actually the minimum slot width is about 0.5 mm.

Based on these tendencies, a small-width slot which provides high separation efficiency and less steam removal is used for the first slot 10 in an area where the water film is thick. More specifically, it is desirable to use a slot with a width as small as possible in a range of 0.5 mm to 1.0 mm; in this embodiment, W1 is about 0.5 mm. As for the second slot 11, it is located as close to the trailing edge of the stationary blade 1 as possible, namely in an area where the blade is very thin and it is difficult to form a slot. However, in this area the amount of water film is smaller than in the area where the first slot is located, so even if a large-width slot, which is easier to form than the first slot 10, is used there, the decline in separation efficiency is slight. For this reason, although the restrictions on the second slot are fewer than on the first slot, desirably the second slot should provide high water film separation efficiency and reduce steam removal like the first slot, so in this embodiment, W2 is about 1.0 mm. Slot width W2 of the second slot is in the range surrounded by the dashed-dotted line in FIG. 5 where there is no substantial drop in separation efficiency and no substantial increase in steam removal.

According to this embodiment, a plurality of slots for removing a water film generated on a blade surface have different widths depending on water film thickness so that the water film can be removed efficiently and splashing of water droplets downstream is minimized and thus erosion of the moving blade is reduced, leading to higher reliability. Concretely, the structure according to this embodiment is estimated to reduce the water film generated and deposited to the stationary blade surface 80% or more.

Furthermore, according to this embodiment, the amount of steam removal or steam sucked together with the water film is much smaller than in the conventional structures, thereby preventing a decline in turbine efficiency.

Second Embodiment

Figure 6:
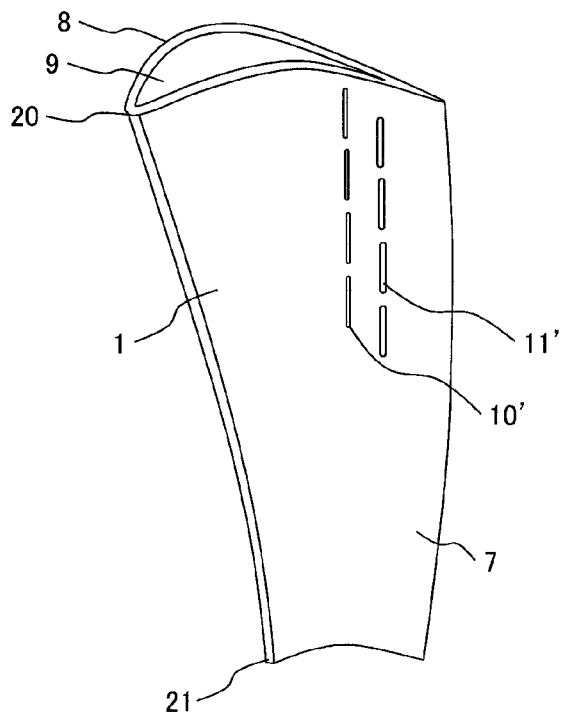
FIG. 6 is a schematic view illustrating a steam turbine stationary blade according to a second embodiment of the invention.

Next, the second embodiment of the present invention will be described referring to FIG. 6. In this embodiment, the number of slots is not one in the stationary blade height direction but several slots are arranged in a broken line pattern. The relation in slot width W between the first slot group 10' and the second slot group 11' is W1<W2 as in the first embodiment. The first slot group 10' and second slot group 11' need not be parallel to each other and may be linear or curved along the shape of the blade trailing edge in the slot length direction. Although FIG. 6 shows a case that the slot groups are formed only on the blade tip side 20 in the height direction of the stationary blade 1 as in the first embodiment shown in FIG. 2, they may extend from the blade root side 21 to the blade tip side 20 along the whole blade length.

This embodiment brings about the same advantageous effects as the first embodiment. In addition, this embodiment offers an advantageous effect that the blade strength can be higher than in the first embodiment in which a long slot is formed and the plate thickness between the blade surface and hollow portion can be decreased.

Third Embodiment

Figure 7:
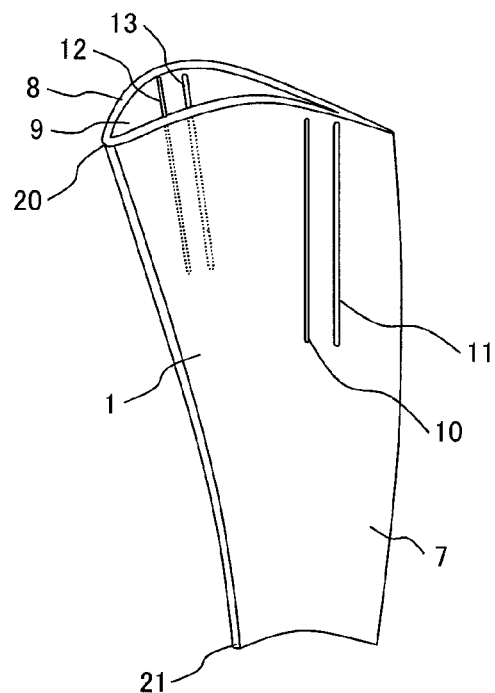
FIG. 7 is a schematic view illustrating a steam turbine stationary blade according to a third embodiment of the invention.

Next, the third embodiment of the present invention will be described referring to FIG. 7. In this embodiment, in addition to the slots formed on the pressure side 7 of the stationary blade 1 according to the first embodiment, several suction slots are provided on the suction side 8. The first slot 12 and second slot 13 on the suction side are arranged with distance D between them. The relation between slot width W1 of the first slot 12 and slot width W2 of the second slot 13 is W1<W2 as in the first embodiment. The first slot 12 and second slot 13 on the suction side need not be parallel to each other and may be linear or curved along the shape of the blade in the slot length direction. As shown in FIG. 7, the slots are formed only on the blade tip side 20 in the height direction of the stationary blade 1 as in the first embodiment shown in FIG. 2, but instead they may extend from the blade root side 21 to the blade tip side 20 along the whole blade length.

In addition to the same advantageous effects as those brought about by the first embodiment, this embodiment enables separation of the water film deposited to the blade surface on the suction side 8 with less steam removal, thereby reducing the erosion of the moving blade more efficiently.

Fourth Embodiment

Figure 8:
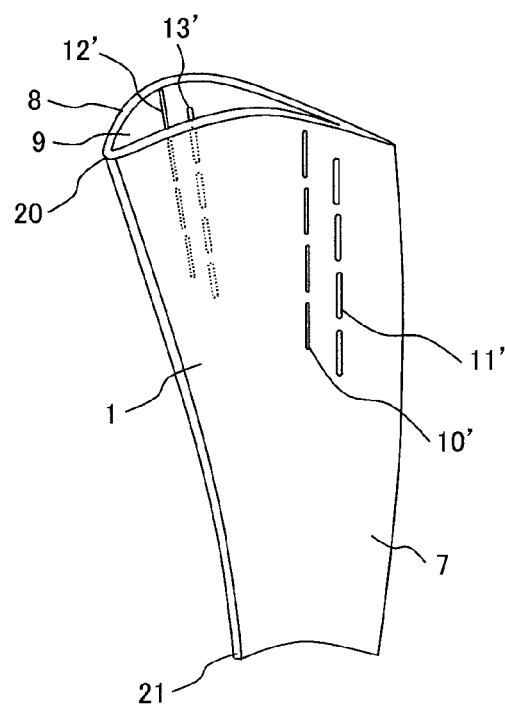
FIG. 8 is a schematic view illustrating a steam turbine stationary blade according to a fourth embodiment of the invention.

Next, the fourth embodiment of the present invention will be described referring to FIG. 8. In this embodiment, in the stationary blade height direction, the number of slots on the suction side 8 is not one but several slots are arranged in a broken line pattern. In addition to the same advantageous effects as those brought about by the third embodiment, this embodiment offers an advantageous effect that the blade strength can be increased and the plate thickness between the blade surface and hollow portion can be decreased as in the second embodiment.

The present invention is not limited to the above embodiments and includes other various forms of embodiments. For example, the above embodiments have been explained in detail for easy understanding of the present invention, but an embodiment of the invention need not include all the elements of the above embodiments. Some elements of an embodiment may be replaced by elements of another embodiment or elements of an embodiment may be added to another embodiment. Also, for some elements of an embodiment, addition of other elements, deletion or replacement is possible.

REFERENCE SIGNS LIST

1 . . . Stationary blade
2 . . . Diaphragm outer ring
3 . . . Diaphragm inner ring
4 . . . Moving blade
5 . . . Disk
6 . . . Water film flow
7 . . . Pressure side
8 . . . Suction side
9 . . . Hollow portion
10 . . . First slot
11 . . . Second slot
12 . . . First slot on the suction side
13 . . . Second slot on the suction side
20 . . . Blade tip side
21 . . . Blade root side
22 . . . Water droplet

The invention claimed is:

1. A steam turbine stationary blade with a hollow inner portion, including:
a plurality of slots formed on a blade surface of the steam turbine stationary blade, extending in a blade height direction and provided in a plurality of lines,
wherein the slots are located on a pressure side of the stationary blade,
wherein the slots include a first slot located upstream in the turbine axial direction and a second slot located downstream of the first slot and having a slot width larger than the slot width of the first slot,
wherein the first slot is located at a position within a range of l/L ratio from 0.6 to 0.8 where l represents a distance along the blade surface from a leading edge of the stationary blade to a given position on the blade surface and L represents a distance along the blade surface from the leading edge of the stationary blade to a trailing edge of the stationary blade,
wherein the second slot is located at a position where the l/L ratio is larger than at the position of the first slot, and
wherein the steam turbine stationary blade with the hollow inner portion is made of a plastically deformed metal plate.

2. The steam turbine stationary blade according to claim 1,
wherein the first slot is 0.5 mm to 1.0 mm in width.

3. The steam turbine stationary blade according to claim 2,
wherein the first slot is about 0.5 mm in width and the second slot is about 1 mm in width.

4. A steam turbine having a turbine stage comprising a steam turbine stationary blade and a moving blade located downstream of the steam turbine stationary blade in a working fluid flow direction,
wherein the steam turbine stationary blade according to claim 3 is used as the steam turbine stationary blade.

5. A steam turbine having a turbine stage comprising a steam turbine stationary blade and a moving blade located downstream of the steam turbine stationary blade in a working fluid flow direction,
wherein the steam turbine stationary blade according to claim 2 is used as the steam turbine stationary blade.

6. The steam turbine stationary blade according to claim 1,
wherein the slots provided in the plurality of lines are arranged in a broken line pattern in the blade height direction respectively.

7. A steam turbine having a turbine stage comprising a steam turbine stationary blade and a moving blade located downstream of the steam turbine stationary blade in a working fluid flow direction, wherein the steam turbine stationary blade according to claim 6 is used as the steam turbine stationary blade.

8. A steam turbine having a turbine stage comprising a steam turbine stationary blade and a moving blade located downstream of the steam turbine stationary blade in a working fluid flow direction, wherein the steam turbine stationary blade according to claim 1 is used as the steam turbine stationary blade.

* * * * *